United States Patent [19]

Tanaka et al.

[11] 4,087,841
[45] May 2, 1978

[54] AUTOMATIC CARTRIDGE-REJECTING APPARATUS FOR A CARTRIDGE TAPE-PLAYING DEVICE

[75] Inventors: Shinsaku Tanaka; Takashi Yamanaka, both of Tokyo, Japan

[73] Assignee: Tanashin Denki Co., Ltd., Tokyo, Japan

[21] Appl. No.: 685,612

[22] Filed: May 12, 1976

[30] Foreign Application Priority Data

Aug. 5, 1975  Japan .................. 50-95273

[51] Int. Cl.² .................. G11B 23/04; G11B 25/06
[52] U.S. Cl. .................. 360/71; 360/93
[58] Field of Search .............. 360/71, 74, 93, 105, 360/106, 78, 132, 137, 96, 69

[56] References Cited

U.S. PATENT DOCUMENTS

| | | | |
|---|---|---|---|
| 3,400,227 | 9/1968 | Lear et al. | 360/93 |
| 3,485,500 | 12/1969 | Loeschner et al. | 360/93 |
| 3,684,300 | 8/1972 | Clark | 360/93 |
| 3,773,334 | 11/1973 | Naito | 360/93 |
| 3,817,539 | 6/1974 | Kawada | 360/71 |
| 3,860,964 | 1/1975 | Kozu et al. | 360/92 |
| 3,921,216 | 11/1975 | Wada | 360/93 |
| 3,927,419 | 12/1975 | Tozawa | 360/92 |

*Primary Examiner*—Alfred H. Eddleman
*Attorney, Agent, or Firm*—Bacon & Thomas

[57] ABSTRACT

An automatic cartridge-rejecting apparatus for use with a cartridge tape-playing device, wherein, when an endless tape is transported fully over any or all of the tracks formed on the endless tape, then the driving force of a capstan-rotating motor is transmitted to an automatic cartridge-rejecting cam through a reduction gear system in response to an electric signal set forth from a track changeover senser; and a driving rod connected to a cam follower continuously pushes a cartridge elastically or detachably locked by a spring in the cartridge-loading unit of the tape-playing device forcefully and gently at a low speed until the cartridge is released from the lock.

1 Claim, 5 Drawing Figures

AUTOMATIC CARTRIDGE-REJECTING APPARATUS FOR A CARTRIDGE TAPE-PLAYING DEVICE

BACKGROUND OF THE INVENTION

This invention relates to an automatic cartridge-rejecting apparatus for an endless magnetic tape-playing device (hereinafter referred to as "a tape-playing device") which comprises a cartridge-loading unit provided with a engagement member, for example, a spring for elastically or detachably locking the cartridge by being inserted into an engagement recess disposed on the outside of the cartridge and driving means for rotating a capstan.

A prior art cartridge loaded into a tape-playing device had the drawback that the engagement member or spring of the cartridge was detachably but lightly locked in the engagement recess thereof, requiring a great force in pulling out the cartridge. Therefore, various mechanisms have been proposed to attain the easy withdrawal of a loaded cartridge. Proposed to date are, for example, the processes of manually unlocking a cartridge; releasing the cartridge by an electromagnet fitted to the cartridge-loading unit of a tape-playing device and actuated by a switch mounted on said device itself or disposed apart therefrom; and automatically withdrawing the cartridge by operating the electromagnet in response to an electric signal sent forth by signal-generating means after an endless tape roll has been rotated fully over all the tracks of an endless tape. However, all the prior art manual and automatic methods have been found unadapted for use with a type-playing device due to the drawbacks that when pushed by the spring out of the loading unit, the cartridge tended to jump out with a great noise, sometimes falling on to the floor; and where the cartridge was magnetically rejected, a large, strong electromagnet consuming a large amount of power had to be used, not only rendering the electromagnet, and consequently the tape-playing device as a whole, considerably expensive but also giving rise to the possibility of the electromagnet momentarily producing a sharp and unpleasant noise when operated for withdrawal of the cartridge.

SUMMARY OF THE INVENTION

It is accordingly the object of this invention to provide an automatic cartridge-rejecting apparatus for a magnetic tape-playing device, which is designed to commence a cartridge-withdrawing action when an endless tape is transported fully over any or all of the tracks formed on the endless tape and continue to push the cartridge gently with a great force until the cartridge is elastically unlocked from the loading unit of the tape-playing device.

To attain the above-mentioned object, this invention provides an automatic cartridge-releasing apparatus which comprises a cartridge-loading unit provided with an engagement member for elastically locking a cartridge by being fitted into an engagement recess disposed on the outside of the cartridge; capstan-rotating means; signal-generating means for sending forth an electric signal, each time an endless tape roll driven by the capstan, as well as by a pinch roller received in the cartridge, is rotated fully over any or all of the tracks formed on the endless tape; cam-actuating means coupled to said capstan-rotating means in response to the electric signal to rotate a cam for automatic withdrawal of the cartridge; and cartridge-pushing means integrally fitted to a cam follower driven by the cam continuously to push the forward end portion of the cartridge by rotation of the cam until the cartridge is elastically unlocked from the cartridge-loading unit.

The automatic cartridge-rejecting apparatus of this invention is characterized in that, where required, the driving force of a motor hitherto used only for the rotation of a capstan and the changeover of a track is diverted through proper mechanism to the pushing of a cartridge with speed reduction to be converted into a great moment, which in turn is utilized continuously to push the cartridge until it is unlocked from the loading unit. Therefore, the automatic cartridge-rejecting apparatus of this invention has the advantages of eliminating the necessity of providing any extra source of a driving force such as a magnet or a spring for pushing a cartridge out of the corresponding loading unit; preventing a sharp and unpleasant noise, particularly an impact noise when the cartridge is automatically taken out; eliminating the possibility of the cartridge being thrown out of the loading unit on to the floor; enabling the cartridge to be readily removed from the loading unit by the hand upon completion of the operation of the automatic cartridge-rejecting mechanism; and loading the cartridge in a proper operating position even when the cartridge is manually inserted into the loading unit in a state just as drawn out, namely, without operating any member of the tape-playing device.

According to a preferred embodiment of this invention, the cam-actuating mechanism comprises a smaller gear wheel received in the capstan-rotating means; a larger gear wheel provided with a notched portion and made engageable with the smaller gear wheel but normally standing at rest with the notched portion disposed to face the smaller gear wheel; an automatic cartridge-rejecting cam mounted on the larger gear wheel; pushing means for normally rotating the larger gear wheel only in a prescribed direction; stopper means normally engaging the larger gear wheel thereby to prevent its rotation; automatic cartridge rejection-initiating means designed to disengage the stopper means from the larger gear wheel upon receipt of a cartridge rejection-instructing signal, cause the larger gear wheel to be rotated over the notched portion by the pushing means for engagement with the smaller gear wheel. The cam-actuating mechanism arranged as described above causes the cam to make a slower rotation than the motor, thereby driving the cartridge-pushing means by the resultant increased rotating moment. The cam-actuating mechanism does not need special parts and assembly method nor any technique of adjustment, thus admitting of easy manufacture.

According to another preferred embodiment of this invention, the cartridge-pushing means comprises a cam follower driven by the cam; a rotating member pivotally supported at one end on the cam follower; and a driving rod fitted to the rotating member to push outward the forward end portion of the cartridge by rotation of the rotating member. Like the cam-actuating mechanism, the cartridge-pushing means requires no special parts and assembly method nor any technique of adjustment, thus admitting of easy manufacture.

DESCRIPTION OF THE PREFERRED EMBODIMENT

Figure 1:
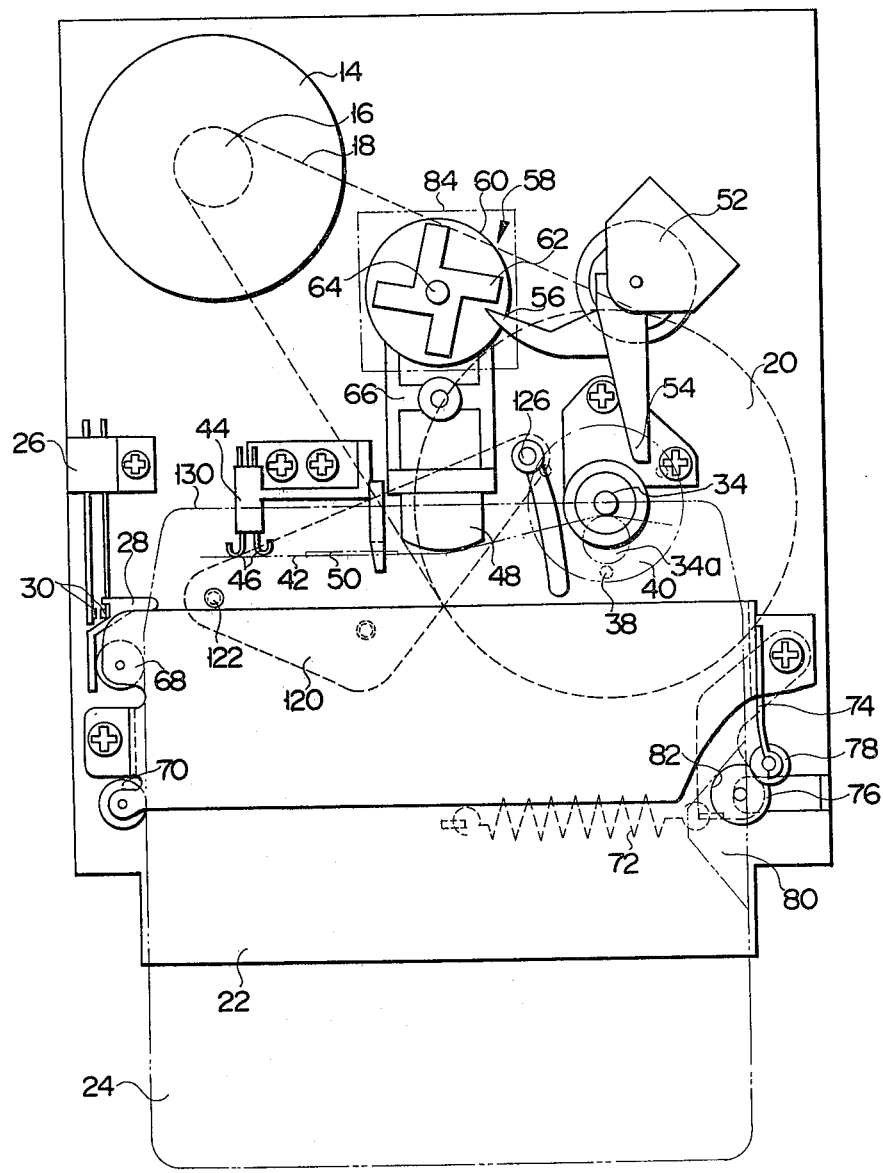
FIG. 1 is a plan view of a tape-playing device provided with an automatic cartridge-rejecting apparatus according to this invention, mainly showing parts mounted on the base plate of said tape-playing device.

FIG. 1 presents parts arranged on the upper side of the base plate 12 of the magnetic tape-playing device provided with an automatic cartridge-rejecting apparatus according to this invention. The main section of the automatic cartridge-rejecting apparatus is positioned under the base plate 12 and illustrated mainly in FIGS. 2 and 3. FIG. 1 only sets forth in broken lines the parts required to describe the schematic operation of the tape-playing device.

Referring to FIG. 1, the driving shaft of a motor 14 mounted on the upper side of the base plate 12 and designed to make a counterclockwise rotation projects to the underside of the base plate 12. The end of said driving shaft is fitted with a pulley 16. The rotation of the motor 14 is transmitted through the pulley 16 and belt 18 to rotate a flywheel 20. When a cartridge 24 is pushed into a cartridge-loading unit 22 provided on the upperside of the base plate 12, then the left edge of the catridge 24 pushes to the left a movable element 28 attached to a first contact unit 26, thereby causing contacts 30, 30 disposed in the power supply circuit of the motor to be brought into contact with each other. The shaft 32 (FIG. 2) of the flywheel 20 driven by the motor 14 is rotated counterclockwise. The shaft 32 projects above and below the base plate 12, the upper section of said shaft 32 constituting a capstan 34, and the lower section thereof forming a smaller gear wheel 36. The top of the upper portion of the shaft 32 of the flywheel 20 is fitted with a turntable 40 whose surface is provided with three projecting elements 38. The capstan 34 is coupled to a pinch rollar 34a (FIG. 1) received in the cartridge 24, causing, for example, a 4-track endless tape 42 (hereinafter referred to as "a tape") to be transported across the two contacts 46,46 of a track changeover senser 44 and magnetic head 48. The two contacts 46,46 are short-circuited by a metal foil 50 attached to the end point of each track of the endless tape, for excitation of an electromagnet 52 each time the tape 42 is transported over any of the four tracks. When excited, the electromagnet 52 pushes downward the integrally formed end portions 54, 56 of armatures. Then the armature end portion 54 engages one of the three projecting elements 38 of the turn table 40 fitted to the shaft 32 of the flywheel 20 to be rotated clockwise, causing the other armature end portion 56 to be rotated similarly clockwise. As a result, said armature end portion 56 engages one of the four projecting members 62 of a driven turn table 60 mounted on a magnetic head-vertically shifting device 58 for rotation of said turn table 60. Accordingly, the shaft 64 of the turn table 60 and a track changeover cam (not shown) fitted to the lower part of said shaft 64 are rapidly rotated intermittently through an angle of 90° each time. At this time, the track changeover cam vertically moves a driven frame 66 and magnetic head 48, thereby effecting the changeover of the respective tracks.

When the cartridge 24 is forced into the cartridge-loading unit 22, then the left edge of the cartridge 24 is supported by guide rollers 69, 70, whereas the right edge of the cartridge 24 is carried forward while pushing to the right a press roller 76 and guide roller 78 normally urged to the left by springs 72, 74 respectively. The press roller 76 acting as an engagement member is brought to rest at an intermediate point of the inclined plane 82 of a substantially V-shaped engagement recess 80 (FIG. 1) formed in the cartridge 24. At this point, the press roller 76 pushes the cartridge 24 in the direction of insertion as well as to the left, causing the pinch roller 34a mounted in the cartridge 24 to be tightly pressed against the capstan 34. As the result, the cartridge 24 itself is securely held in the cartridge-loading unit 22.

Figure 3:
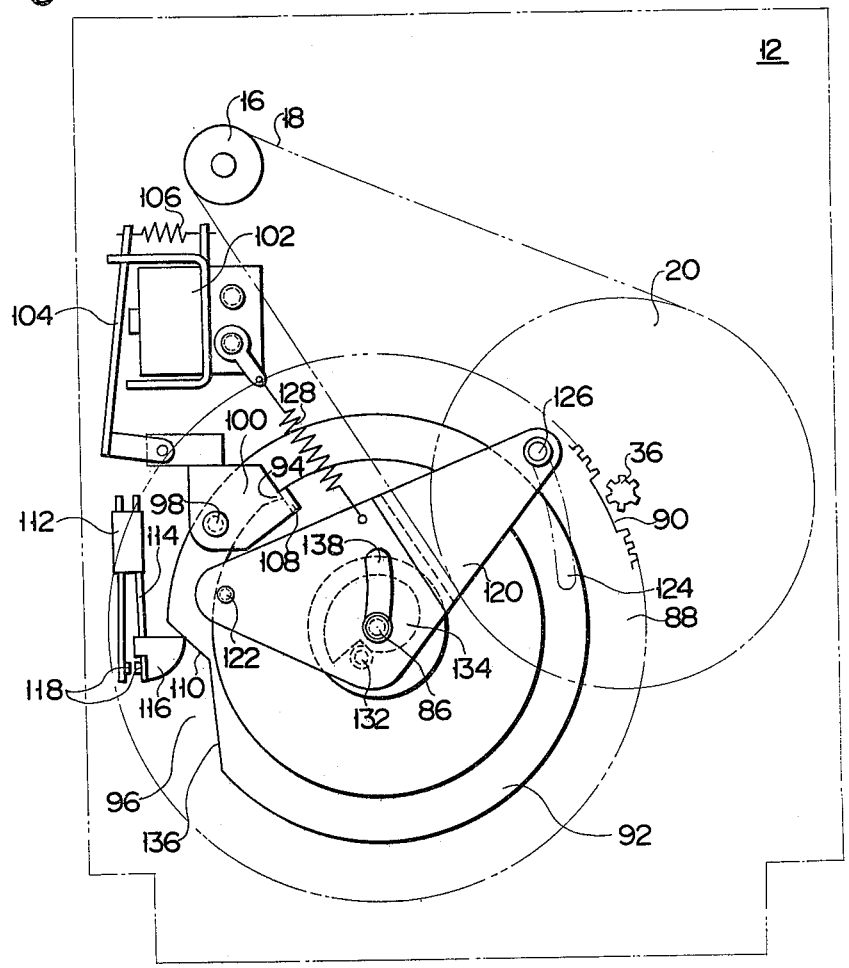
FIG. 3 is a view of the cam-actuating mechanism and cartridge-pushing means, mainly showing parts disposed under the base plate of said tape-playing device.

The automatic cartridge-rejecting apparatus of this invention used with a tape-playing device can withdraw the cartridge when the endless tape 42 is transported fully over any or all of the tracks formed on the tape 42. In the former case, a metal foil 50 attached to the end point of the respective tracks short-circuits the contacts 46,46 for excitation of an electromagnet 102 (FIG. 3). In the latter case, contact is established for a short time between a contact 156 (FIG. 5) and the arm 146 (FIG. 5) of an automatic cartridge-rejecting switch 84 fitted to the upper part of the shaft 64 of the magnetic head-vertically shifting device 58. The above-mentioned contact causes the electromagnet 102 to be actuated through a signal converter 176 (FIG. 5), thereby commencing the automatic cartridge-rejecting action. Operation of an electric circuit used with the tape-playing device is later detailed by reference to FIG. 5.

Figure 2:
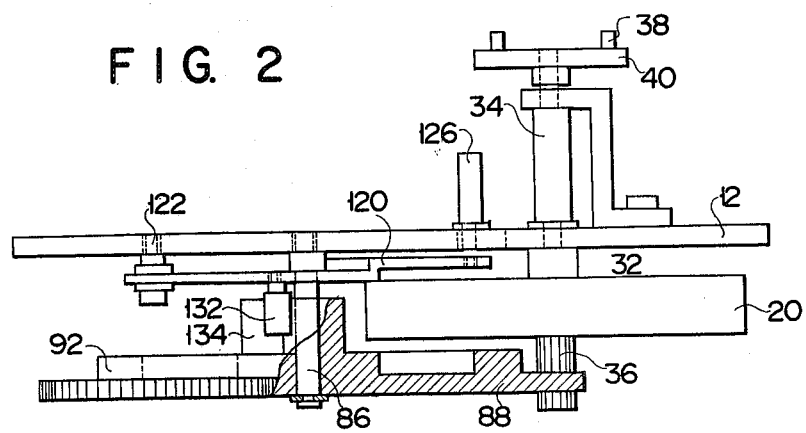
FIG. 2 is a side elevation of the cam-actuating mechanism and cartridge-pushing means included in the tape-playing device of FIG. 1, as viewed from the side of the cartridge-loading unit.
Figure 4:
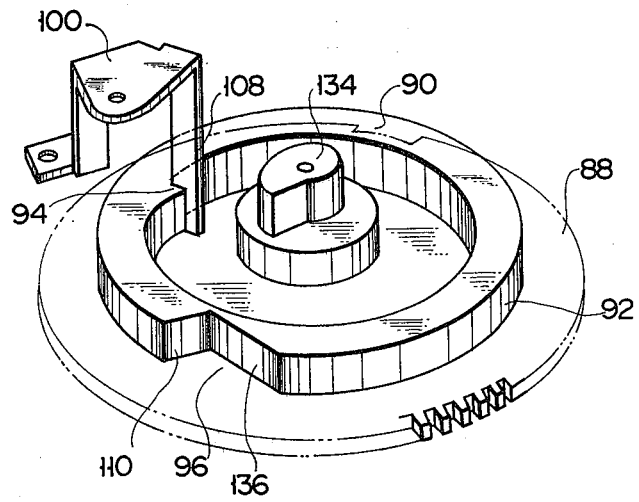
FIG. 4 is an oblique view illustrating the general outline of the main part of the cam-actuating mechanism.

Description is now given by reference to FIGS. 2 and 3 of the arrangement and operation of the automatic cartridge-rejecting mechanism. A larger gear wheel 88 rotatably supported on a shaft 86 threadedly inserted into the base plate 12 is so disposed as to be engaged with the smaller gear wheel 36. Normally, however, while the automatic cartridge rejection is not carried out, the notched portion 90 of the larger gear wheel 88 faces the smaller gear wheel 36, causing the larger gear wheel 88 to stand at rest, with the smaller gear wheel 36 alone allowed to be rotated. As shown in FIGS. 3 and 4, that side of the larger gear wheel 88 which faces the base plate 12 is provided with a ring-shaped ridge 92 rectangular in cross section. A stepped portion 94 is formed at one part of the inner peripheral wall of the ring-shaped ridge 92. A deformed V-shaped recess 96 is provided on the outer peripheral wall of the ring-shaped ridge 92 at a point properly spaced from said stepped portion 94.

A start-stop member 100 (FIG. 3) is rotatably supported on a pivotal shaft 98 whose lower end is threadedly inserted into the base plate 12. While an electromagnet 102 fitted to the underside of the base plate 12 is not excited, an armature 104 is pulled by a spring 106 to urge the start-stop member 100 counterclockwise, thereby establishing engegement between the stopper end 108 of said start-stop member 100 and the stepped portion 94 formed on the inner peripheral wall of the ring-shaped ridge 92, and consequently preventing the larger gear wheel 88 from making a clockwise rotation.

Under this condition, one inclined plane 110 of the V-shaped recess 96 formed in the outer peripheral wall of the ring-shaped ridge 92 is urged to the right by a driving member 116 fitted to the lower end of a plate spring 114 included in a second contact unit 112 attached to the underside of the base plate 12. Though the larger gear wheel 88 may tend to rotate clockwise, yet said rotation is obstructed by the aforesaid engagement between the stopper end 108 of the start-stop member 100 and the stepped portion 94 formed on the inner peripheral wall of the ring-shaped ridge 92.

The contacts 118,118 of the second contact unit 112 (FIG. 3) are connected in parallel with the contacts 30,30 of the first contact unit 26 (FIG. 1), and are left open while the driving member 116 is inserted into the V-shaped recess 96 of the ring-shaped ridge 92.

A rotatable triangular plate 120 (FIG. 3) is rotatably supported on a pivotal shaft 122 threadedly inserted into the base plate 12. One apical portion of the rotatable triangular plate 120 is provided with a driving rod 126 extending upward through one end of an elongate hole 124. The rotatable triangular plate 120 is normally so urged as to make a counterclockwise rotation by a spring 128, one end of which is fixed to the base plate 12. Under this condition, the driving rod 126 is positioned, as shown in FIG. 1, spaced from the inner edge 130 of the cartridge 24.

A cam follower 132 (FIG. 3) projecting downward from the triangular plate 120 engages the lowest portion of a cam 134 mounted on the larger gear wheel 88, while both larger and smaller gear wheels 88, 36 remain disengaged from each other, as shown in FIG. 3. When excited, the electromagnet 102 magnetically attracts the armature 104 to rotate the start-stop member 100 clockwise and release the stopper end 108 from the stepped portion 94 formed on the inner wall of the ring-shaped ridge 92. As the result, the larger gear wheel 88 is pushed by the driving member 116 to make a clockwise rotation for engagement with the smaller wheel 36. Later, the larger gear wheel 88 continues a clockwise rotation by being driven by the smaller gear wheel 36. Since the contacts 46,46 are short circuited by the metal foil 50 only for a short time, the excitation of the electromagnet 102 is brought to an end in a short time. The stopper end 108 slides along the inner wall of the ring-shaped ridge 92. When the larger gear wheel 88 is rotated, the driving member 116 is pushed on to the outer peripheral wall of the ring-shaped ridge 92 along the other inclined plane 136 of the V-shaped recess 96. Accordingly, the contacts 118,118 of the second contact unit 112 are closed to cause the driving member 116 to slide along the outer peripheral wall of the ring-shaped ridge 92.

When the larger gear wheel makes a clockwise rotation, the cam 134, cam follower 132 and in consequence triangular plate 120 and driving rod 126 are rotated about the shaft 122 similarly clockwise. As the result, the driving rod 126 pushes outward the inner edge 130 (FIG. 1) of the cartridge 24 for its withdrawal from the cartridge loading unit 22. During the above-mentioned operation, the rotation of the motor 14 is transmitted to the large diameter flywheel 20 through the small diameter pulley 16 and belt 18 in turn and then through the smaller and larger gear wheels 36, 88 to turn the cam 134. As the result, the cam 134 is rotated at a far more reduced speed than the motor 14 and in consequence with a great rotation moment. Therefore, the driving rod 126 pushes the cartridge 24 out of the cartridge-loading unit 22 continuously and gently at a slow speed. The elongate hole 138 formed in the triangular plate 120 allows said plate 120 to be freely rotated regardless of the shaft 86. The elongate hole 124 formed in the base plate 12 enables the driving rod 126 freely to revolve around the shaft 122.

When the cartridge 24 is carried outward with its inner edge pushed by the driving rod 126, then the movable element 28 (FIG. 1) is shifted to the right to open the contacts 30,30 of the first contact unit 26. Since, at this time, the contacts 118,118 of the second contact unit 112 remains closed, the motor 14 continues rotation, causing the cartridge 24 to be continuously carried outward.

When the cartridge 24 locked in the cartridge-loading unit 22 is moved outward with its inner edge 130 pushed by the driving rod 126, then the press roller 76 (FIG. 1) is shifted to the right along the inclined plane 82 of the engagement recess 80, until the press roller 76 is removed from said engagement recess 80 and carried outward to the right side of the cartridge 24. At this time, the cam 134 makes one clockwise rotation, starting with the position (FIG. 3) which it occupied before the automatic withdrawal of the cartridge 24 was commenced. When the cam 134 completes said clockwise rotation, the cam follower 132 which, during the cam rotation, caused the triangular plate 120 and driving rod 126 to be rotated clockwise by being pushed by the cam 134 is pulled by the spring 128 to the original position (FIGS. 1 and 3) which said cam follower 132 occupied before the automatic withdrawal of the cartridge was commenced. In consequence, the triangular plate 120, driiving rod 126 and cam follower 132 are brought back to the original position. When the cam 134 makes one clockwise rotation, the driving member 116 enters the V-shaped recess 96 formed on the outer peripheral wall of the ring-shaped ridge 92 to be pressed against the inclined plane 110. As the result, the contacts 118,118 of the second contact unit 112 are opened to stop the motor 14, causing the larger gear wheel 88 and consequently the ring-shaped ridge 92 to be rotated clockwise. This clockwise rotation is brought to an end, when the stepped portion 94 formed on the inner wall of the ring-shaped ridge 92 engages the stopper end portion 108 of the start-stop member 100. At this time, the larger gear wheel 88 stands at rest, with its notched portion disposed to face the smaller gear wheel 36. The cartridge 24 pushed outward by the driving rod 126 and brought to rest with the press roller 76 shifted to the right side of the cartridge 24 can be easily taken by hand out of the cartridge-loading unit 22 of the tape-playing device.

Figure 5:
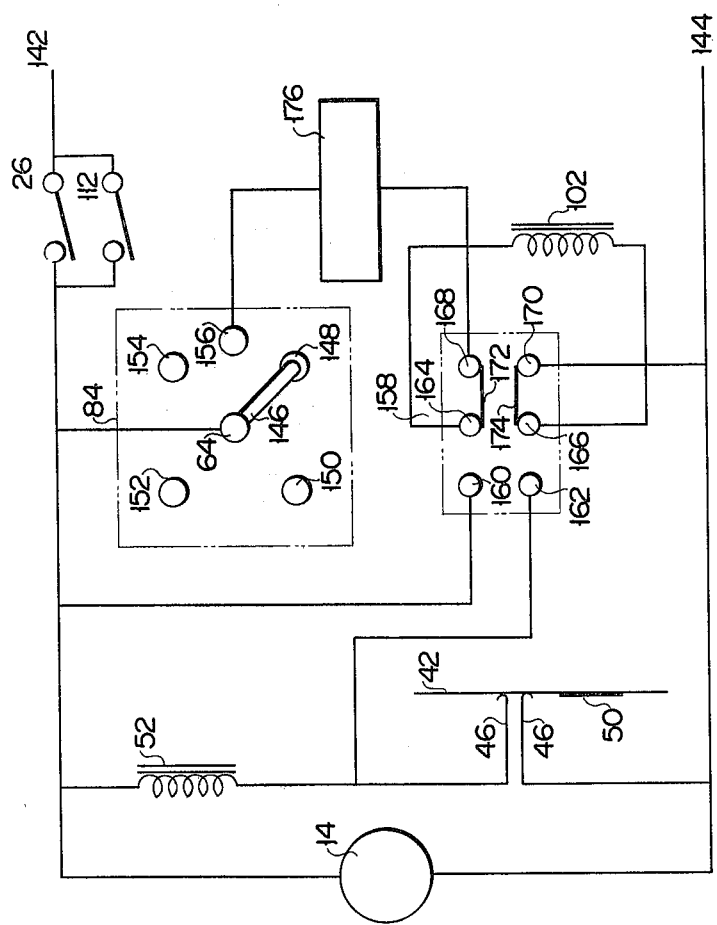
FIG. 5 shows an electric circuit used with the automatic cartridge-rejecting apparatus of this invention.

There will now be described by reference to FIG. 5 the arrangement and operation of an electric circuit used with the automatic cartridge-rejecting apparatus of this invention. Power sources 142, 144 are connected to the motor 14 through the first and second parallel connected contact units 26, 112. When the cartridge 24 is inserted into the cartridge-loading unit (FIG. 1), the first contact unit 26 is closed to start the rotation of the motor 14. When the metal foils 50 attached to the endless tape 42 short-circuits the contacts 46,46 of the track changeover senser 44 during the rotation of the endless tape 42, then the electromagnet 52 is connected to the power sources 142, 144 to rotate the shaft 64 (FIG. 1) and operate the magnetic head-vertically shifting device 58, thereby bringing the magnetic head 48 (FIG. 1) to a position corresponding to the succeeding track.

The arm 146 of the automatic cartridge-rejecting switch 84 is quickly rotated through an angle of substantially 90°. The arm 146 remains at this position until the contacts 46,46 are short-circuited again. Four contacts 148, 150, 152, 154 are provided at four points at which the arm 146 is successively brought to rest. The contact 148 is that which is contacted by the arm 146, while the first track is used. The contacts 150, 152, 154 are those successively contacted by the arm 146 when the following second, third and fourth tracks are used in turn. If these contacts 148, 150, 152, 154 are each provided with, for example, a display lamp, then it is possible to find the sequential order of any of the tracks which is currently used. A contact 156 is positioned between the contact 148 corresponding to the first track and the contact 154 corresponding to the fourth track, and temporarily short-circuited by the arm 146 while said arm 146 is rapidly shifted from the contact 154 to the contact 148. Short-circuiting between the arm 146 and contact 156 will be later detailed. An automatic cartridge-rejection changeover switch 158 is provided at a suitable spot in the automatic cartridge-rejecting apparatus and is provided with contacts 160, 162, 164, 166, 168, 170 and contact arms 172, 174. when the automatic cartridge-rejection changeover switch 158 is manually operated to establish connection of the contact arm 172 to the contacts 164, 160 and connection of the contact arm 174 to the contacts 166, 162, then the electromagnets 52, 102 are actuated at the same time. When the rotation of any of the tracks is brought to an end, then the electromagnet 102 is actuated automatically to withdraw the cartridge 24. The metal foil 50 is chosen to have such a length as enables the contacts 46, 46 to be short-circuited for a sufficient length of time for actuation of the electromagnet 52 and causes said metal foil 50 to be moved away from the contacts 46, 46 after automatic rejection of the cartridge, releasing said contacts 46, 46 from short-circuiting, and allowing the succeeding playing to be smoothly carried out by inserting the cartridge again.

Where the contact arm 172 of the automatic cartridge rejection changeover switch 158 is connected to contacts 164, 168 and the contact arm 174 is connected to contacts 166, 170, then the electromagnet 102 is connected to the power sources 142, 144 through a signal converter 176 and the aforesaid automatic cartridge rejection changeover switch 158 is actuated only when the contact arm 146 of the automatic cartridge-rejecting switch 84 touches the contact 156 between the fourth and first tracks. Contact between the contact 156 and contact arm 146 is brought to an end in an extremely short time, presenting difficulties in actuating the electromagnet 102 to carry out the automatic rejection of the cartridge. Therefore, the signal converter 176 is supplied with an electric signal ganerated by the momentary contact between the contact 156 and contact arm 146 and converts said electric signal into another electric signal continuing for a relatively long time, for example, 100 to 500 ms, thereby exciting the electromagnet 102 for said extended time easily to carry out the automatic rejection of the cartridge.

The automatic cartridge rejection changeover switch 158 and signal converter 176 which may be positioned at any desired spot in the subject cartridge-rejecting apparatus are not particularly indicated in FIGS. 1 to 4.

The signal-generating device comprising the contacts 46, 46, metal foil 50 attached to the tape 42, automatic cartridge-rejecting switch 84, signal converter 176 and automatic cartridge rejection changeover switch 158 enables the cartridge to be automatically rejected, each time the endless tape 42 is transported over any or all of the tracks through selective operation of said automatic cartridge rejection changeover switch 158.

The automatic cartridge-rejecting apparatus of this invention has the advantages that the cartridge is withdrawn automatically by the motor 14 used as a power source, eliminating the necessity of providing any other source of driving power such as a strong spring, or magnet; the rotation of the motor 14 is transmitted to the driving rod 126 for its movement after the speed of said rotation has been fully reduced by means of the belt mechanism consisting of the pulley 16, belt 18 and flywheel 20 and gear wheels 36, 88, thereby causing the cartridge 24 to be continuously pushed outward gently at a slow speed but with a great force without any sharp impact noise; and the driving rod 126 which has gently pushed the cartridge 24 outward with the press roller 76 shifted to the right is carried backward to stop any further movement of the cartridge 24, which in turn is kept at a rest spot in a readily withdrawable state without the possibility of being thrown out of the cartridge-loading unit 22.

What we claim is:

1. An automatic cartridge-rejecting apparatus for a cartrdige tape-playing device, comprising:
   a cartridge loading unit including an engagement member for elastically locking a cartridge, having a recess provided on the outside of the cartridge, by being fitted into said recess;
   driving means for rotating a capstan;
   electric signal-generating means for sending forth a cartrdige rejection-instructing signal, each time an endless tape is transported over any or all of the tracks formed on the endless tape;
   an automatic cartridge-rejecting cam mechanism including a smaller gear wheel on the driving means, a larger gear wheel capable of engagement with the smaller gear wheel and normally standing at rest with a notched portion of the larger gear wheel disposed to face the smaller gear wheel while an automatic cartridge-rejecting function is not performed, an automatically operable rejecting cam on the larger gear wheel, a pressing means normally urging the larger gear wheel in a prescribed direction, said pressing means comprising an inclinded plane of a V-shaped recess formed on a ring-shaped ridge mounted to the larger gear wheel and a driving member normally disposed within the V-shaped recess to press the inclined plane and to be pushed out of the recess after rotation of the larger gear wheel to slide on the surface of the ring-shaped ridge, a stopper means normally engaged with the larger gear wheel to stop rotation of the larger gear wheel, said stopper means comprising a stepped portion formed on the inner peripheral wall of the ring-shaped ridge and a start-stop member normally engaged with the stepped portion, and an automatic rejection initiating means driving the start-stop member to be disengaged from the stepped portion and allow the driving member to push the larger gear wheel to be engaged with the smaller gear wheel so as to continue the rotation of the larger gear wheel, said initiating means including a magnet driving the start-stop member in response to an electric signal;

a cartridge-pushing mechanism fixed to a cam follower driven by said rejecting cam and pushing the tip portion of the cartridge so as to push the cartridge from the cartridge loading portion to be released from the elastic locking said cartridge-pushing mechanism including a cam follower co-operating with the cam, a rotary member fitted to the cam follower and having one end pivoted, and a driving rod pushing the tip portion of the cartridge;

a first contact unit serving to connect a power source to the driving means when the cartridge has been loaded in the cartridge-loading portion; and a second contact unit disposed in parallel with the first contact unit, normally kept open by the motion of the driving member entering the V-shaped recess, and closed when the automatic rejection is performed by the motion of the driving member pushed out of the V-shaped recess so as to keep the power source connected to the driving means until the driving piece enters again the V-shaped recess regardless of the state of the first contact unit.

* * * * *